United States Patent [19]
Siegert

[11] Patent Number: 5,540,763
[45] Date of Patent: Jul. 30, 1996

[54] PROCESS AND COMPOSITION FOR MARKING AND IDENTIFYING POURABLE MATERIALS

[75] Inventor: Paul Siegert, Pinneberg, Germany

[73] Assignee: aktual Bauteile und Umweltschutz Systeme, GmbH, Tornesch, Germany

[21] Appl. No.: 390,745

[22] Filed: Feb. 17, 1995

[30] Foreign Application Priority Data

Feb. 25, 1994 [EP] European Pat. Off. .............. 94102841

[51] Int. Cl.⁶ .............................. C09D 11/00; C05G 3/00
[52] U.S. Cl. ........................................ 106/19 R; 106/19 C
[58] Field of Search ................................. 106/19 R, 19 C

[56] References Cited

U.S. PATENT DOCUMENTS

| | | | |
|---|---|---|---|
| 3,107,591 | 10/1963 | Frakenhoff | 106/19 R |
| 3,672,842 | 6/1972 | Florin | 106/21 A |
| 5,135,569 | 9/1992 | Mathias | 106/19 R |
| 5,356,465 | 10/1994 | Eldridge | 106/21 R |

FOREIGN PATENT DOCUMENTS

| | | |
|---|---|---|
| 2599044 | 11/1987 | France . |
| 105724 | 8/1975 | Japan . |
| 297480 | 12/1991 | Japan . |
| 226462 | 5/1968 | U.S.S.R. . |
| 2176204 | 12/1986 | United Kingdom . |
| 2235206 | 2/1991 | United Kingdom . |

Primary Examiner—Helene Klemanski
Attorney, Agent, or Firm—Richard S. Roberts

[57] ABSTRACT

A composition and process for identifying the origin or quality of loose, pourable materials by mixing the materials with one or more marking bodies which have a color, consistency or other visibly identifiable property different from the pourable materials. The marking bodies in the mixture do not impair the intended use of the pourable materials. The origin or quality of the pourable materials can be identified at a point in time distant from the forming of the mixture and even after manufacturing article with the mixture. The pourable materials can be peat, compost, humus, clay, lava, pumice-stone, sand, fertilizers, soil stabilizers, soil improving substances, recycled soil substances, soil drainage substances and soil fillers.

20 Claims, No Drawings

PROCESS AND COMPOSITION FOR MARKING AND IDENTIFYING POURABLE MATERIALS

BACKGROUND OF THE INVENTION

1. Field of the Invention

The invention relates to a process, composition and use of marking bodies for marking and identifying pourable materials.

2. Description of the Prior Art

It is frequently desired to mark or identify the origin and quality of pourable materials which are frequently used in large quantities and which can be natural substances. For this purpose records can be made, or e.g. plates can be prepared on which corresponding record entries are made. This is relatively complicated and disadvantageous, because such records or plates can be lost. Even with the aid of detailed descriptions of such materials on delivery notes and/or invoices or packings, the problem is still not solved. Thus, for example, in the case of greened areas, and in particular on roofs, use is made of substrates, drainage bulk and filling materials of different qualities, which are based on specific starting material, formulations and production processes.

In general building planners, architects or contractors are not in a position to evaluate the quality or origin of the materials used. The obvious appearance or characteristics establishable by manual samples generally differs, sometimes even between individual batches, due to the varying appearances of natural materials, different origins and frequently changing moisture contents. However, it is virtually indispensable for the responsible parties to establish on delivery and installation whether the requested quality has also been supplied and installed, particularly as architects have a long-term planning responsibility. A contractor must be able to expect that the promised characteristics or effects are actually obtained. Objectively, up to now, the characteristics or properties of such substrates or materials have only been possible by analysis at specialized institutes or laboratories. However, the testing methods can last several weeks or months and lead to costs which can exceed the material price, depending on the object size. Obviously, high-quality substrates and drainage bulk materials are much more expensive than those with a lower quality. It is therefore clear that it is advantageous and important to be able to rapidly and easily distinguish such pourable materials on the basis of their origin and/or quality. Thus, even after purchase has taken place and independently of whether supplied loose or in packed form and both at the time of use or installation and at a distant time, it is possible to establish from where they come and that their action has not been impaired, although their overall appearance may have been considerably changed.

This problem is solved according to the process of the invention by the use of a marking body within a substrate material. In addition, the present invention can also be described as the use of one or more natural or synthetic, not difficultly or easily degradable or decomposable foreign bodies for marking and identifying pourable substances or materials which can be differentiated visibly as a result of their colors, consistency or some other property from the loose or bulk materials to be identified, without impairing the function of the latter.

SUMMARY OF THE INVENTION

The invention provides a process for marking and identifying loose, pourable materials to indicate their origin or quality which by adding one or more marking bodies to the pourable material to form a mixture. The marking bodies have a color, consistency or other visibly identifiable property different from the loose, pourable materials to be identified. The presence of the marking bodies in the mixture does not impair the use of the mixture to form an element as compared to a similar element formed from the pourable materials without the marking bodies. The origin or quality of the pourable materials can be identified at a point in time after the formation of the mixture and after the formation of an element with the mixture. The pourable materials comprise one or more components selected from the group consisting of peat, compost, humus, clay, lava, pumicestone, sand, fertilizers, soil stabilizers, soil improving substances, recycled soil substances, soil drainage substances and soil fillers. The invention also provides a composition capable of such identification.

DETAILED DESCRIPTION OF THE PREFERRED EMBODIMENT

The invention provides a simple and clean process which can be rapidly and inexpensively performed and which permits the identification of bulk material on delivery and installation, and optionally also after several years, so that its origin and quality can be reliably determined. Obviously, only sufficient foreign or marking bodies are used as permit an identification within an appropriate interval of time, without having to be excessively sought. As these marking bodies may be synthetic and not or only difficulty decomposable and are only present in very small quantities, they do not impair the function of the pourable material. It is also logical that these marking bodies must differ with respect to their color, consistency or some other property from the pourable materials, so that they can be easily detected. If a certain number of marking bodies are added per $m^3$, they are recognizable on delivery and installation on the bulk material surface. In addition, at any random time they can be made to appear by spreading the bulk material over a larger surface so that, calculated per $m^2$ they can be made visible on the surface and permit a reliable identification. In the preferred embodiment the marking bodies may have a diameter of from about 2 to about 10 mm and a thickness of from about 1 to about 10 mm. The marking bodies may comprise a natural or synthetic material which is or is not easily degradable by weathering or biodegradability. Synthetic materials include plastics.

When using such pourable materials it can also be advantageous to only have such marking bodies in materials at the time of delivery for a few days or weeks after the installation or incorporation of such materials. Suitable materials for such rapidly or medium-term degradable or decomposable marking bodies are e.g. paper, board or wood, which can be degraded in a few days or weeks as a function of the temporary moisture content of the bulk material. It would also be conceivable to produce such marking bodies from corn or potato starch. Thus, for example, in the pharmaceutical industry, there are numerous tablets, which dissolve rapidly before or after ingestion and which largely consist of starch as the carrier. As a function of the size of the marking body and the binders used, such marking bodies will also decompose within a few hours, days, or weeks.

An example of the medium-term stability of such marking bodies, e.g. made from starch are the "putting inserts" used in golf. It is required that these inserts reliably decompose within one vegetation period or one year. It is obvious that the probability of identification is increased with a rising number of marking bodies. Further advantages and features which in particular relate to the nature of the pourable materials, the quantity of the marking bodies and their structure or design are part of the invention. The marking bodies may have the shape of the logo, trademark or flower and which ensure good marking and identifying possibilities.

Examples of the invention are described in greater detail hereinafter. The pourable materials or substrates can contain one or more of the following constituents: peat, bark humus, so-called top soil or subsoil, lava, limestone fines or chips, pumice, expanded clay, expanded shale, mineral or organic recycling substances, vermiculite, fertilizers, other action improving agents, etc. Obviously the substrates can have different compositions in accordance with the most varied fields of use, such as for intense greened roof areas, plant containers for very high plant demands, extensively greened roof areas with demanding vegetation, as well as with lower plant demands. The invention can be used as well as for greening underground car parks with substrate thickness of approximately 25 to 50 cm, or as a filling substrate layer under an underground car park substrate as from a depth of about 50 cm. The invention can be used as well as a tree substrate for top quality avenue trees and at isolated locations. A useful tree hole depth is approximately 40 to about 180 cm tree hole depth. The composition can be used for peat bed substrates for soils for special demands, e.g. of azaleas and rhododendrons or for vegetation forms with very different demands. The composition can be used as container substrates for raising plants in pots and nurseries, larger isolated containers, as well as for drainage material for rapidly draining away excess water whilst at the same time storing plant-available water in drainage layers. All the substrates and materials are so adjusted by special formulations that they meet the particular use requirement and offer optimum growth conditions for the particular plant types.

The invention is not restricted to the aforementioned pourable materials and can instead be used in wider technical fields, if such materials have to be marked and subsequently identified, such as can e.g. be the case with chemical products, detergent or concrete aggregates.

In the following three Tables 1 to 3, in each case, a certain number of mixing tests with different loose, pourable, earth substrate materials are given and to which are added a varying number of green marking bodies in the form of crushed, expanded clay granules with a diameter of 6 to 10 mm. One hundred such green marking bodies have a weight of approximately 17 grams. However, for the expert other weights and shapes are conceivable for the marking bodies according to the invention. However, it is readily apparent that it is also possible to use different colored marking bodies, also made from different materials and in different sizes and which can still act in accordance with the invention. For this purpose 100 or 60 liters of substrate are fed into a mixing drum, to which are subsequently added the marking body quantities given in the tables. The mixing drums are then rotated for about 10 minutes in order to simulate the substrate production process, so that a good mixing of the marking bodies with the particular substrate is ensured. The mixture is then completely transferred into a 1 m² box whose side edge height is 15 cm. Using a wood lath the mixture surface is flattened. Determination then takes place by counting of the number of marking bodies which are visible and this is given in the tables.

In a further process step the mixture is watered from above with a hose sprinkler in order to produce or simulate natural conditions, such as e.g. rain. Subsequently determination takes place by counting of the number of marking bodies which are now visible. The values are given in the tables.

TABLE 1

Optima Intensive Substrate Type I/01 for Intensive Roof Greened Areas.

| | Marking bodies Added | Visible/ dry No./m² | Visible/ watered No./m² |
| --- | --- | --- | --- |
| 1.1 100 l Substrate | 25 | 1 | 3 |
| 1.2 100 l Substrate | 50 | 4 | 5 |
| 1.3 100 l Substrate | 100 | 7 | 13 |
| 1.4 100 l Substrate | 200 | 11 | 21 |

TABLE 2

Optima Underground Car Park Substrate Type H 0/25

| | Marking bodies Added | Visible/ dry No./m² | Visible/ watered No./m² |
| --- | --- | --- | --- |
| 2.1 100 l Substrate | 100 | 7 | 12 |
| 2.2 100 l Substrate | 200 | 13 | 29 |

TABLE 3

Optima Mineral Substrate Type M2/10 (Expanded Clay Bodies)

| | Marking bodies Added | Visible/ dry No./m² | Visible/ watered No./m² |
| --- | --- | --- | --- |
| 3.1 60 l Substrate | 15 | 4 | 4 |
| 3.2 60 l Substrate | 30 | 6 | 8 |
| 3.3 60 l Substrate | 60 | 10 | 11 |
| 3.4 60 l Substrate | 120 | 16 | 16 |

It is obvious that if a large number of marking bodies are used, such as is the case with tests 1.3, 1.4, 2.1, 2.2, and 3.3 and 3.4, a corresponding large number of marking bodies can be identified on the surface of the subsequently spread out material. Thus, from the practical standpoint with approximately 100 liters of substrate, 25 marking bodies should be adequate because test 1.1 shows that subsequently 1 or 3 per m² are visible.

In the case of the substrates in question, the test quantity of 25 bodies per 100 l of substrate is adequate. Mathematically it can be gathered therefrom that for 1 m³ (=100 l) 250 marking bodies lead to a sensible result. However, according to the invention the numbers can also be reduced, e.g. to 100 marking bodies/m³, provided that the subsequent identification work is not too tiresome. Values below 100 marking bodies/m³ are therefore also conceivable. From about 10 to about 100 marking bodies added to the mixture per m³ of pourable materials is preferred. However, it is naturally undesirable to add too many marking bodies to the substrates or loose, pourable materials, because this leads to additional costs and possible to an undesirable appearance. Therefore, for the aforementioned substrates, an upper limit of 1000 marking bodies/m³ appears suitable. However, this value does not constitute a clearly defined upper limit, because loose, pourable materials with other characteristics may make necessary different numbers of marking bodies. However, the expert can easily establish the desired quantity of marking bodies by a few tests.

What is claimed is:

1. A process for producing a substrate composition for growing plants, which composition has identifying means to indicate the origin or quality of the composition, which process comprises substantially uniformly mixing loose, pourable, plant growing medium materials and a plurality of marking bodies to form a mixture, which marking bodies have a color, consistency or other visibly identifiable property different from the loose, pourable materials to be identified, and wherein the presence of the marking bodies in the mixture does not impair the use of the mixture to form an element as compared to a similar element formed from the pourable materials without the marking bodies, and wherein the origin or quality of the pourable materials can be identified at a point in time after the formation of the mixture and after the formation of an element with the mixture, and wherein the pourable materials comprise one or more components selected from the group consisting of peat, compost, humus, clay, lava, pumice-stone, sand, fertilizers, vermiculite, soil stabilizers, soil improving substances, recycled soil substances, soil drainage substances and soil fillers.

2. The process according to claim 1, wherein the marking bodies comprise a natural or synthetic material which is degradable.

3. The process according to claim 1, wherein the marking bodies comprise a material which is substantially not degradable.

4. The process according to claim 2, wherein from about 10 to about 100 marking bodies are added to the mixture per m$^3$ of pourable materials.

5. The process according to claim 1 wherein the marking bodies comprise colored balls, crushed materials, disks or chips comprising plastic, paper, board, wood, corn or potato starch.

6. The process according to claim 1 wherein the marking bodies are in the shape of a logo.

7. The process according to claim 1 wherein the marking bodies are in the shape of a flower.

8. The process according to claim 1 wherein the marking bodies have a diameter of from about 2 to about 10 mm.

9. The process according to claim 1 wherein the marking bodies have a thickness of from about 1 to about 10 mm.

10. The process according to claim 1 wherein the marking bodies have a diameter of from about 2 to about 10 mm and a thickness of from about 1 to about 10 mm.

11. A substrate composition for growing plants which comprises a substantially uniform mixture of loose, pourable, plant growing medium materials and a plurality of marking bodies in the pourable materials, which marking bodies have a color, consistency or other visibly identifiable property different from the loose, pourable materials which indicate the origin or quality of the loose, pourable materials, which marking bodies in the mixture do not impair the use of the mixture to form an element as compared to a similar element formed from the pourable materials without the marking bodies, and wherein the origin or quality of the pourable materials can be identified at a point in time after the formation of the mixture and after the formation of an element with the mixture, and wherein the pourable materials comprise one or more components selected from the group consisting of peat, compost, humus, clay, lava, pumice-stone, sand, fertilizers, vermiculite, soil stabilizers, soil improving substances, recycled soil substances, soil drainage substances and soil fillers.

12. The composition according to claim 11, wherein the marking bodies comprise a natural or synthetic material which is degradable.

13. The composition according to claim 11, wherein the marking bodies comprise a material which is substantially not degradable.

14. The composition according to claim 12, wherein from about 10 to about 100 marking bodies are added to the mixture per m$^3$ of pourable materials.

15. The composition according to claim 11 wherein the marking bodies comprise colored balls, crushed materials, disks or chips comprising plastic, paper, board, wood, corn or potato starch.

16. The composition according to claim 11 wherein the marking bodies are in the shape of a logo.

17. The composition according to claim 11 wherein the marking bodies are in the shape of a flower.

18. The composition according to claim 11 wherein the marking bodies have a diameter of from about 2 to about 10 mm.

19. The composition according to claim 11 wherein the marking bodies have a thickness of from about 1 to about 10 mm.

20. The composition according to claim 11 wherein the marking bodies have a diameter of from about 2 to about 10 mm and a thickness of from about 1 to about 10 mm.

* * * * *